Jan. 26, 1937.　　　L. M. KEEFE　　　2,068,682
RELAY WINDING
Filed June 29, 1933　　　2 Sheets-Sheet 1
Fig. 1.
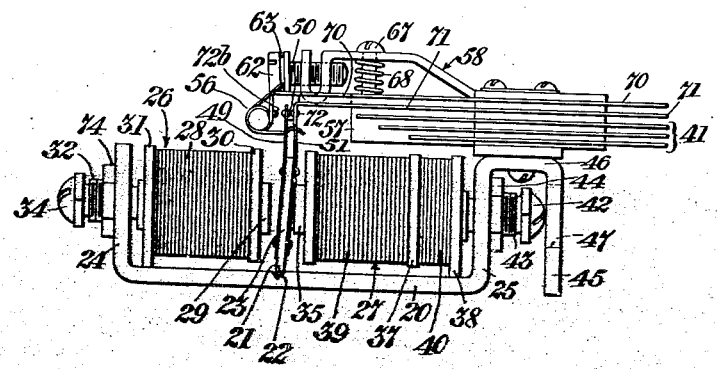
Fig. 2.
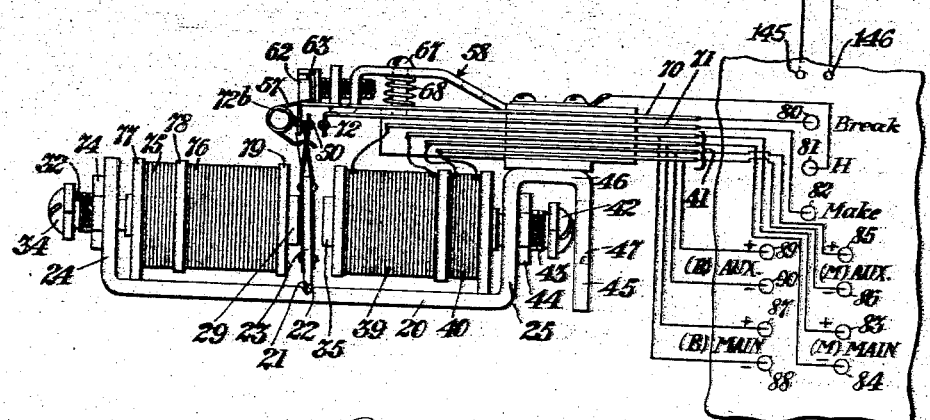
Fig. 3.
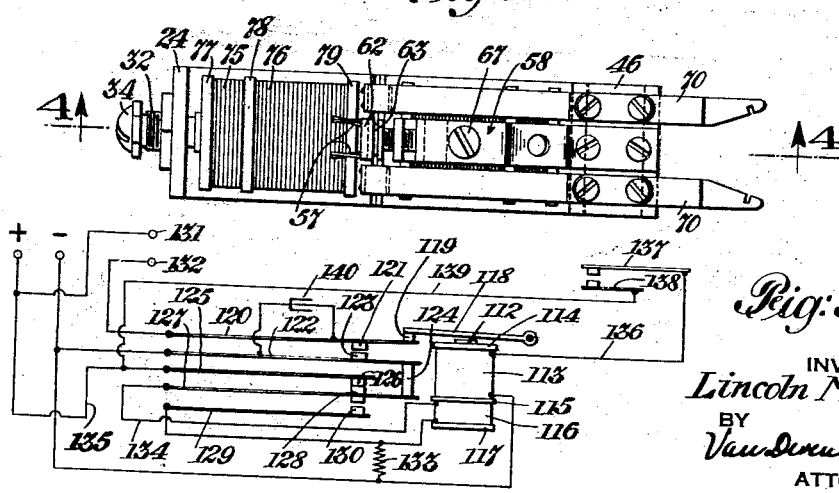
Fig. 9.
INVENTOR
Lincoln M. Keefe
BY
Van Deventer & Grier
ATTORNEYS.

Jan. 26, 1937.  L. M. KEEFE  2,068,682
RELAY WINDING
Filed June 29, 1933  2 Sheets-Sheet 2
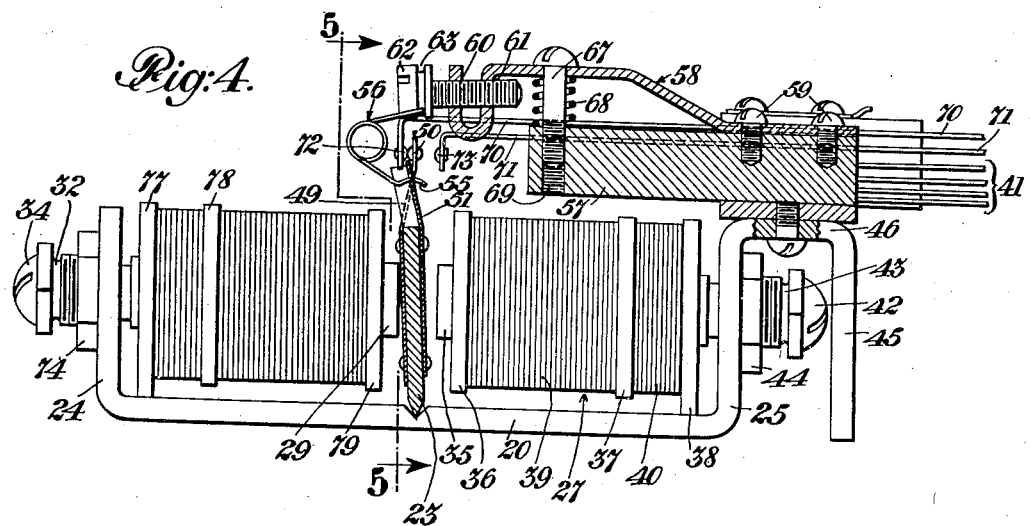
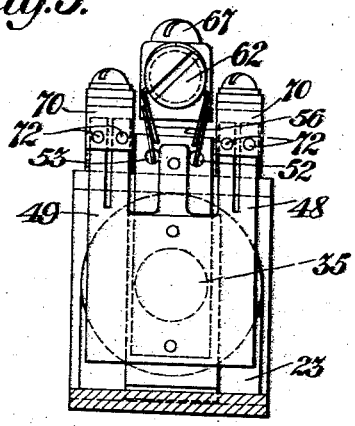
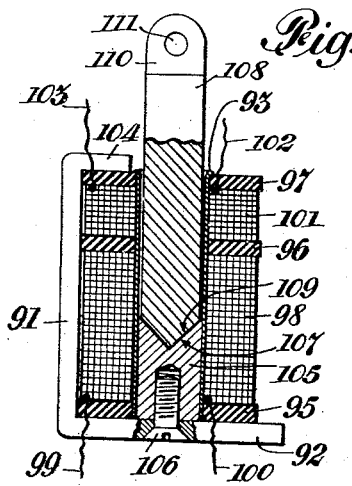
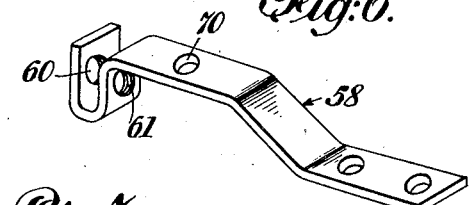
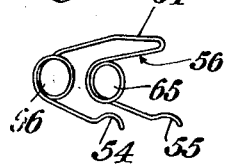
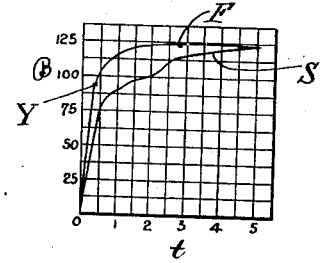
INVENTOR
Lincoln M. Keefe
BY
Van Deventer + Griet
ATTORNEYS.

Patented Jan. 26, 1937

2,068,682

UNITED STATES PATENT OFFICE 2,068,682

RELAY WINDING

Lincoln M. Keefe, Springfield, Mass.

Application June 29, 1933, Serial No. 678,209

10 Claims. (Cl. 175—320)

This invention relates to improvements in relays, and more particularly to magnet coil windings in relays and the like, and has for an object the provision of a magnet winding in which the time element required for building up the magnetic flux may be selectively altered without disturbing the windings thereof.

Another object of the invention is the provision in a relay of a double winding disposed about the core thereof having the ends of both of said windings terminate in suitable terminals; selectively connecting one of said windings to a source of current, thereby building up a small initial flux in the core so that when the second coil is connected to a source of current the flux rapidly builds up to a maximum and attracts the armature of the relay. When one of the coils is connected to a source of current the flux is not of sufficient strength to attract the armature, but when the second coil is excited, the flux having initially been built up part of the way, builds up to a maximum very rapidly and the response of the armature is faster than it has been possible to obtain heretofore.

A further object of the invention is the provision of means for selectively short circuiting one of said windings and subsequently supplying current to the other of said windings, thereby slowing down the speed at which the flux builds up in the coils and resulting in a slow acting magnet.

Another object of the invention is the provision in a relay of a magnet coil having a double winding thereon so arranged that before the operation thereof one of said coils may be excited to provide an initial flux in its core, whereupon the act of supplying current to the second coil causes the flux in the core to build up to a maximum very rapidly and thereby actuate the armature, whereupon the movement of the armature disconnects the first coil from the source of current and short circuits the same so that when the current flowing to the second coil is interrupted there is a time lag in the release of the armature.

A still further object of the invention is the provision in relays of simple and effective toggle springs and adjustments therefor.

Other objects of the invention will be apparent to those skilled in the art.

Referring to the drawings:

Figure 1 is an elevation of a double acting relay including one embodiment of the invention;

Figure 2 is an elevation of a double acting relay including two double wound magnet windings;

Figure 3 is a plan view of the relay shown in Figure 2;

Figure 4 is an enlarged view of the relay shown in Figure 2 with the armature and the parts containing the adjustment screws shown in section along the line 4—4 of Figure 3;

Figure 5 is a view partly in section along the line 5—5 of Figure 4;

Figure 6 is a perspective view of the toggle adjustment screw arm;

Figure 7 is a perspective view of the toggle spring;

Figure 8 is a view, partly in section, of a solenoid employing the new and improved double winding;

Figure 9 is a diagrammatic view showing a single acting relay employing the new and improved double winding and having contactors actuated by the armature thereof and so arranged in circuit with a source of current that the armature thereof is rapidly actuated and slowly released; and Figure 10 is a magnetization curve showing approximately the building up of the flux in the core when the magnet coil is arranged to act rapidly and also when it is arranged to act slowly.

In the tabulating and other record controlled machines and in master control devices such as shown and described in copending application Serial No. 554,191, filed July 31, 1931, of which the present application is a continuation in part, it is sometimes advantageous to have one or more relays operate very rapidly, at a normal rate of speed, or very slowly, according to the pattern of the indicia in the record cards. Heretofore, this has been impossible, but the new and improved magnet winding herein disclosed and described makes it not only entirely possible but very easily accomplished.

When it is desired to have the armature of a relay operate very fast, current is sent through the small winding of the magnet coil bringing the magnetic flux up to the point, for example, indicated at Y on the magnetization curve, Figure 10, which is not of sufficient strength to attract the armature of the relay. This is done at some time previous to the instant at which the relay is required to operate. Now having the magnet core partially magnetized (up to the point Y on the curve F) the initial time element required to build the flux up to the point Y is saved. Therefore, when current is sent through the second or main winding of the magnet coil the magnetic flux takes less time to build up from the point Y to the maximum than it would take to build up from zero to the maximum, resulting in less time passing by between the excitation of the main magnet winding and the movement of the armature.

If the terminals of the small winding are left open and no current is passed through, when the main winding is excited the armature responds at a normal speed.

If the terminals of the small winding are short circuited the winding acts as a choke and retards the building up or the demagnetization of the core when the main winding is connected to or disconnected from a source of current as indicated by the curve S in Figure 10.

The relay shown in Figure 1 consists of a main frame 20. A V slot 21 is formed in the body 20 and serves as a bearing for the knife edge 22 of the armature 23. The frame 20 has sides 24 and 25 formed at right angles to the straight portion containing the V slot 21 and serve as supports for the magnet coils 26 and 27.

The magnet coil 26 consists of a single winding 28 upon a core 29 between the insulated heads 30 and 31. A bushing 32 is tapped into the frame side member 24 and a screw 34 passes through the bushing 32 into a threaded hole in the core 29, thereby securing the magnet 26 to the frame. The screw 34 may be loosened and the bushing 32 screwed into or out of the frame member 24, thereby adjusting the position of the core 29 relative to the armature 23. When the proper position is obtained the screw 34 may be permanently tightened and the bushing 32 may be locked relative to the frame member 24 by the lock nut 74.

The magnet coil 27 consists of a core 35, having heads of insulation 36, 37 and 38 secured thereto. A main winding 39 is provided on the magnet core 35 between the heads 36 and 37 and an auxiliary winding 40 is provided on the core 35 between the heads 37 and 38. For convenience, the ends of the windings 28, 39 and 40 may terminate in a series of connecting strips some of which are shown at 41. A screw 42, a sleeve 43 and a lock nut 44 are provided for adjusting the position of the magnet core 35 relative to the armature 23 in the same manner as described in connection with the adjustment of the magnet core 29.

The frame side member 25 is bent at right angles forming a flat portion 46 and the portion 46 is bent at right angles forming a second flat side parallel to the side member 25. A hole 47 is provided in the member 45 in line with the bushing 43 so that the bushing and the screw 42 may be adjusted therethrough.

The flat portion 46 forms a support for the connection strips 41, contact members and the toggle adjustment screw supporting arm which will be presently described.

The armature 23 has the bottom face thereof in the form of a knife edge 22 and has secured thereto a pair of split contact arms 48 and 49 and each of the contact arms is provided with a double contact point 50.

The armature 23 also has a plate 51 secured thereto in any suitable manner. The plate 51 has holes 52 and 53 formed therein adapted to be engaged by hooks 54 and 55 formed in a toggle spring designated generally by the numeral 56.

The flat portion 46 has supported thereon a metallic block 57 which serves as a support for the arm 58, the arm being secured to the block by means of screws 59. This arm has one end bent in the form of a U through which holes 60 and 61 are tapped in line with each other. After these holes are tapped the sides of the U are bent apart slightly so that when a screw is screwed into the holes 60 and 61 the tension therebetween tends to lock the screw in any position.

A fillister head type of screw 62 is screwed into the holes 60 and 61 and a groove 63 is provided in the head of the screw to engage a flat portion 64 of the toggle spring 56. The spring 56 also has circular loops 65 and 66 formed therein and by screwing the screw 62 back and forth in the holes 60 and 61 and the arm 58, the toggle action may be adjusted, and once the proper adjustment is obtained this adjustment is retained due to the tension on the threads thereof by the U shaped portion of the arm.

A screw 67 passes through the hole 78 in the arm 58 and engages threads in a hole 69 in the bar 57. A spring 68 surrounds the screw 67 and is positioned between the bar 57 and the arm 58. By screwing the screw 67 into the bar 57 the loops 65 and 66 in the spring 56 are slightly wound up resulting in greater tension of the spring against the holes 52 and 53 in the plate 51 carried by the armature 23 and the head of the screw 62. By loosening the screw 67 this tension may be decreased.

The flat portion 46 also insulatedly supports a plurality of contact strips 41 previously described and the contact arms 70 and 71. The contact arm 70 is provided with a contact point 72 and the contact arm 71 is provided with a contact point 73. The contact point 72 is adapted to cooperate with the double contact 50 carried by the armature member 49 in one position and the contact point 73 is adapted to cooperate with the contact point 50 in the other position of the armature 23.

Due to the toggle action, the armature 23, when attracted by one of the magnet cores, swings over to a point adjacent to the actuating core and remains in this position until the magnet core opposite is energized. For example, in Figure 1, as shown, the core 35 has attracted the armature 23 to the right and established contact between the center contacts 50 and the contacts 73 on the contact arms 71. The armature will remain in this position until the opposite core 29 is energized by having current passed through its winding 28, whereupon said core will attract the armature and swing the same over until contact is established between the center contacts 50 and the contacts 72 on the contact arms 70 and the armature 23 will remain in this position until again attracted by the magnet core 35.

The magnet core 29 with its winding 28 functions at a normal rate of speed, whereas the magnet core 35 with the main winding 39 and the auxiliary winding 40, may be caused to function at normal speed, abnormal speed, and sub-normal speed. To function at normal speed the main winding 39 is used only. To function at abnormal speed (faster) the auxiliary winding 40 is excited previous to the instant at which the magnet must function, building up an initial flux in the core, so that when the main winding is excited the time increment required for the flux to build up to a maximum is less. To function at subnormal speeds (slower) the auxiliary winding 40 is short-circuited so that it acts as a choke to retard the building up of flux in the core to a maximum.

In the modification shown in Figures 2 and 4, the magnet core 29 is also provided with a main winding 76 and an auxiliary winding 75, the main winding being positioned on the core 29 between the heads 78 and 79, and the auxiliary winding 7 between the heads 77 and 78. Conections between these windings and the connector strips on the opposite side of the block 57 are carried out in the same manner as those between the windings 39 and 40 and the connector strips 41 in Figure 2.

All operative points of the relay may terminate in a series of pluggable jacks, so that selective connections may be made thereto by means of plug wires. The contact arm 70 may terminate in a jack 80, the frame of the relay may terminate in a jack 81 and the contact arm 71 may terminate in a jack 82. The jack 80 may be termed the "break" jack, the jack 81 may be termed the "hinge" jack and the jack 82 may be termed the "make" jack. A pair of jacks is provided and connected to a source of current, the jack 145 being connected to the positive side of the source and the jack 146 being connected to the negative side of said source. This terminology is the same as that used in referring to the jacks in co-pending application Serial Number 554,191, filed July 31, 1931.

When the magnet core 35 is energized, the armature 23 will be attracted thereto and the contact 50 carried by the armature will make contact with the contact point 72 carried by the contact arm 71, and when the magnet core 29 is energized the armature 23 is attracted thereto and contact between the contact point 50 and the contact point 72 is broken, whereupon contact is established between the contact point 50 and the contact point 72$^b$ carried by the contact arm 70. The main winding 39 on the core 35 may terminate in jacks 83 and 84 and the auxiliary winding 40 may terminate in jacks 85 and 86. The jacks 83 and 84 may be termed the "(M) Main", meaning the main winding on the "make" magnet coil, and to guide the making of proper connections thereto these jacks are labeled "plus" and "minus".

The jacks 85 and 86 may be termed the "(M) Aux", meaning the auxiliary winding of the "make" magnet coil. These jacks also have their polarities indicated to facilitate in making the proper connections thereto. In both cases, the "plus" jacks may connect to the outside ends of the windings, and the jacks labeled "minus" may be connected to the inside ends of the windings (nearest to the magnet core 35). Likewise, the main "break" winding 76 on the core 29 may terminate in jacks 87 and 88, and the auxiliary "break" winding 75 may terminate in jacks 89 and 90.

This arrangement of jacks makes it possible to excite either or both of the cores 29 and 35 by means of the auxiliary windings 75 and 40, respectively, in the manner hereinbefore described, so that when the main windings 76 or 39 are energized the flux in either core rapidly builds up to a maximum and causes a fast response of the armature 23; or the magnet cores 29 and/or 35 may be operated normally by the use of the main windings 39 or 76 alone; or either of magnet cores may be caused to build up slowly by short-circuiting its auxiliary winding so that when the main winding is energized the choking effect of the short-circuiting auxiliary winding causes the flux therein to build up slowly, with the consequent slow working of the armature 23.

With this arrangement it is quite evident that it is possible to selectively connect the windings of the relay so that it will (1) make rapidly and break rapidly; (2) make rapidly and break slowly; (3) make rapidly and break at a normal rate of speed; (4) make slowly and break rapidly; (5) make slowly and break slowly; (6) make slowly and break normally; (7) make normally and break rapidly; (8) make normally and break slowly; (9) make normally and break normally. By means of series or parallel connections between the main and auxiliary windings, many other effects may be obtained.

In Figure 8, the same principle is shown as applied to a solenoid. A yoke 91 has a right angle portion 92 forming the base of the solenoid. A sleeve 93 may be preferably of a non-ferrous metal, for example, brass, and is split lengthwise by means of a slot (not shown), and provided with heads 95, 96 and 97, preferably of insulation. The sleeve 93 may be, if desired, made of insulating material, in which case the slot would not be necessary. A main winding 98 is provided on the sleeve 93 between the heads 95 and 96, and having the wires 99 and 100 brought out so that connections may be made thereto.

The sleeve 93 is also provided with an auxiliary winding 101, which has wires 102 and 103 brought out so that connections may be made thereto. The yoke 91 has an upper right angle portion 104 extending from a part adjacent to the sleeve 93 when the solenoid winding is positioned thereon. The sleeve with its windings thereon may be placed in a position on the base 92 and shoved to the left, as viewed in Figure 8, and the plug 105 inserted and secured to the base by a screw 106. The upper end of the plug 105 is hollowed out in the form of a hollow cone 107. A plunger 108 has its lower end 109 of conical form, matching the hollow cone 107. The upper end of the plunger 108 may have a flat 110 milled therein, and may be provided with a hole 111 for linking the same up to impart the motion of the plunger to suitable mechanisms, the normal position of the plunger being such that most of its length is outside the sleeve, and in line therewith.

By means of the wires 102 and 103, the auxiliary winding may be connected to a source of current, thereby building up the flux to, for example, the point "Y", on the curve "F", prior to the time the solenoid is to be actuated, then, when current is sent through the main winding 98, by means of the wires 99 and 100, the flux rapidly builds up to a maximum, and the response of the plunger 108 is faster than it would be without the auxiliary excitation.

The solenoid may be connected to operate slowly by short-circuiting the wires 102 and 103, and if the main winding 98 is used alone, the solenoid will operate at a normal rate of speed.

The relay shown diagrammatically, in Figure 9, is a single acting relay. In other words, it operates when current is supplied to its windings and attracts the armature as long as the actuating current is supplied thereto, and releases the armature as soon as the current is interrupted.

This relay has a core 112 having therein a main winding 113 positioned between the heads of insulation 114 and 115, and an auxiliary winding 116 positioned between the heads 115 and 117. The auxiliary winding 116 is in the case of this relay utilized both to cause the flux in the core to build up very rapidly and thereby attract the armature 118, and to act slowly in releasing the armature 118 as will presently be described.

The armature 118 is so arranged that through the medium of a bumper 119, preferably of insulated material, motion therefrom may be imparted to a plurality of contact arms which will now be described.

A contact arm 120 is directly engaged by the bumper 119, which carries a contact point 121. A contact arm 122 carries a contact point 123 adapted to cooperate with the contact point 121. The contact arm 125 carries a contact point 126 which normally makes contact with a double contact point 128 connected by the contact arm 127. A push rod of insulation 124 is provided for connecting the contact arm 122 to the contact arm 127 so that they may be moved simultaneously. A contact arm 129 carries a contact point 130 which is adapted to cooperate with the double contact point 128 carried by the contact arm 127.

These contact arms are so arranged relative to each other and to the armature 118 that when the armature is attracted by the core 112 contact is established between the contact points 121 and 123 and as said contact is established, contact between the contact point 126 and the double contact point 128 is broken, then immediately after contact is established between the double contact point 128 and the contact point 130.

The method of connecting the contact arms and the reason for establishing and breaking the contacts in the order named will now be described.

Binding posts 131 and 132 are provided on this relay for connecting the same to any circuit or device which it is to control. The binding post 131 is connected to the positive side of a source of current, and the binding post 132 is connected to contact arm 120. Contact arm 122 is connected to the negative side of the line.

One end of the main winding 113 is connected to the negative side of the line and one end of the auxiliary winding is connected to the negative side of the line via a suitable resistor 133. The other end of the auxiliary winding 116 is connected to the contact arm 127 via the wire 134, and when the contact arms are in normal position the contact arm 127 via the contact points 128 and 126 and the contact arm 125, connects to the positive side of the line through the connection 135. The other end of the main winding 113 is connected via the wire 136 to the contactor 137 which, for example, may correspond to one of the brushes in a tabulating machine. The contactor 138 is connected by a wire 139 to the contact arm 125 and to the "plus" side of the line. To prevent undue sparking between the contacts 121 and 123, a capacitor 140 is shunted across the contact arms 120 and 122.

Now, assuming that instrumentalities to be controlled by this relay are connected to the binding posts 131 and 132 (for example, the reset coils of one or more relays, such as the coil 28 in Figure 1), and assuming that current is flowing through the auxiliary winding 116 which may be traced as follows: from the negative side of the line and via the resistor 133 to the auxiliary winding 116, from the auxiliary winding 116 via the wire 134 to the contact arm 127 and via the contact points 128 and 126 to the contact arm 125 and via the wire 135 to the positive side of the line.

Now, assuming that the contactors 137 and 138 are brought into engagement by any means, for example, by the presence of a hole in a given position in a record card, the main winding 113 is energized. The path of the current energizing this winding may be traced as follows: from the negative side of the line to one end of the main winding 113 from the other end of the main winding 113, via the wire 136 to the contactor 137 and on to the contactor 138, thence, via wire 139 to the wire 135 and the positive side of the line. The auxiliary winding 116 having previously set up an initial flux in the core 112 (for example, up to the point "Y" on the curve shown in Figure 10), the act of energizing the main winding 113 causes the flux to build up to a maximum in the core 112 in a shorter time than if the auxiliary winding 116 had not been excited.

When the flux in the core 112 builds up to a maximum, the armature 118 is thereby attracted and via the bumper 119 moves the contact arm 120 downward, as viewed in Figure 9, and establishes contact between the contact points 121 and 123, and thereby connecting the binding post 132 to the negative side of the line. The motion of the armature 118, in addition to closing the contacts 121 and 123, as described, also via the push rod 124 breaks contact between the contact point 126 and the contact point 128, thereby disconnecting the auxiliary winding 116 from the line. Immediately after this contact is broken by the motion of the same push rod 124, contact is established between the contact point 128 and the contact point 130, thereby short-circuiting the auxiliary winding 116.

The short-circuiting of the auxiliary winding 116 is for the purpose of causing the flux in the core 112 to die down slowly when the main winding 113 is de-energized by the breaking of contact between the contactors 137 and 138, the short-circuited coil tending to set up forces that resist changes in the number of lines of force in the core 112.

Thereafter this arrangement shown in Figure 9 and above described provides a single acting relay which attracts the armature and holds the same until current passing through the main winding is broken, and having added features and instrumentalities which cause it to actuate the armature very rapidly and to release the same slowly. The actuation and deactuation of this relay may be under the control of holes in a record card but the control of the facilities for making it act fast or slowly is directly under control of the armature itself.

It is obvious that any instrumentality to be controlled by this relay, if the same has its return wire connected to the same positive side of the line, to effect control it would only be necessary to connect its other terminal to the binding post 132, in which case the connection to the binding post 131 would be unnecessary.

Many modifications may be made in the device without departing from the spirit of invention.

What is claimed is:

1. In a high speed relay an electro-magnetic core, a movable member adapted to be actuated by said core, a main winding and an auxiliary winding on said core, record controlled means for energizing said auxiliary winding to build up an initial flux in said core of less than sufficient strength to actuate said member whereby the lag incident to building up the magnetic flux in said core to a maximum when said main winding is energized is reduced, and a single source of current for energizing said windings.

2. In a high speed relay an electro-magnetic core, a movable member adapted to be actuated by said core, two windings on said core one of said windings having more ampere turns than the other, the winding of less ampere turns being adapted when energized to build up an initial magneto-motive force in said core of less than sufficient strength to actuate said member, whereby the lag incident to building up the magnetomotive force to a maximum in said core upon the energization of the main winding is reduced, and a single source of current for energizing said windings.

3. In a high speed relay an electro-magnetic core, a movable member adapted to be actuated by said core, and a main winding and an auxiliary winding on said core, said windings terminating in a series of jacks, and a source of current also terminating in jacks, whereby said windings may be selectively connected to said source thereby predetermining the speed at which said relay operates.

4. In a high speed relay an electro-magnetic core, a movable member adapted to be actuated by said core, two windings on said core one of which has more ampere turns than the other, a plurality of contact arms operatively engaged by said movable member, a plurality of sockets some of which are connected to said windings and some of which are connected to said contact arms, a pair of sockets connected to a source of current, and means including plug wires for interconnecting said sockets whereby a plurality of selective variations of speed in the operation of said relay may be obtained.

5. In a device of the character described an armature carrying a movable contact arm, a stationary contact arm adapted to cooperate with said movable contact arm in one extreme position of said armature, a second stationary contact arm adapted to cooperate with said movable arm when said armature is in the extreme opposite position, a pair of electro-magnets one of which is positioned on one side of said armature and the other on the opposite side of said armature, said magnets each having main and auxiliary windings the latter being comprised of less ampere turns than said first windings, and a panel having a plurality of jacks mounted therein some of said jacks forming the terminals of all operative points of said device, and others of said jacks forming terminals for a source of current, whereby they may be selectively interconnected for a plurality of operating conditions.

6. In a relay a yoke, a pair of electro-magnets supported by said yoke and oppositely disposed therein, a pivoted armature between adjacent poles of said magnets, a contact arm carried by said armature and movable therewith, a pair of stationary contact arms supported on said yoke and having contact points positioned adjacent to each side of said movable contact arm, a double contact point carried by said movable contact arm and adapted to cooperate with said stationary contact points, a toggle spring engaging said armature to urge the same against its pivots and adapted to hold the armature in such positions that said movable contact always engages one or the other of said stationary contacts, and adjustable means supported on said yoke and engaging said toggle spring for adjusting the latter both laterally and longitudinally.

7. A relay as claimed in claim 6 in which an arm supported on the yoke is provided for carrying a toggle spring adjusting screw having a groove therein engaging a straight portion of the toggle spring, whereby the spring may be adjusted laterally relative to the armature, and a second screw at right angles to said first screw adapted to increase or decrease the vertical tension of said toggle spring.

8. A relay as claimed in claim 6 in which the armature is pivoted in a V slot in said yoke, and in which an arm supported on said yoke carries a screw longitudinally adjustable relative to the cores of said magnets whereby a toggle spring engaging said armature and a circular groove in said screw may be adjusted relative to the slot.

9. In a relay, a yoke, a pair of electro-magnets supported by said yoke and oppositely disposed therein, the active ends of said magnets being positioned adjacent to each other, a V-slot formed in said yoke between said magnets, an armature having a knife edge positioned in said V-slot, said armature being positioned between adjacent poles of said magnets, a contact arm carried by said armature and movable therewith, a pair of stationary contact arms insulatedly supported on said yoke, some of said stationary contact arms having contact points positioned adjacent to one side of said movable contact arm, others of said stationary contact arms having contact points positioned adjacent to the other side of said movable contact arm, contact points carried by said movable contact arm adapted to cooperate with contact points on said stationary contact arms, a support carried by said yoke, a screw carried by said support adapted to move in a line substantially parallel to the center axis of said magnets, means forming a groove in said screw, a toggle spring having free ends engaging said armature, and a connected portion opposite said free ends engaging said groove, whereby the position of said connected portion may be changed relative to an axis passing through said V-slot.

10. A device according to claim 9 in which said support is provided with a lateral adjustment whereby the tension of said toggle spring against said armature may be varied.

LINCOLN M. KEEFE.